United States Patent
Yamagiwa et al.

(10) Patent No.: US 6,825,759 B2
(45) Date of Patent: Nov. 30, 2004

(54) AIR PRESSURE DETECTION DEVICE FOR A WHEEL

(75) Inventors: Toshio Yamagiwa, Saitama (JP); Tomoyuki Harada, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/058,283

(22) Filed: Jan. 30, 2002

(65) Prior Publication Data

US 2002/0101342 A1 Aug. 1, 2002

(30) Foreign Application Priority Data

Jan. 30, 2001 (JP) ........................................ 2001-021670

(51) Int. Cl.⁷ .............................................. B60C 23/00
(52) U.S. Cl. ...................... 340/445; 340/442; 340/447; 340/427; 343/713; 73/146.4; 73/146.8
(58) Field of Search ................................ 340/445, 448, 340/427, 447, 442; 343/700 MS, 711, 712, 713, 714–717; 73/146, 146.2, 146.3, 146.4, 146.5, 146.8; 116/34 R, 34 A, 34 B (56) References Cited

U.S. PATENT DOCUMENTS

| | | | | |
|---|---|---|---|---|
| 3,281,784 A | * | 10/1966 | Farthing | 340/447 |
| 3,810,090 A | * | 5/1974 | Davis et al. | 340/447 |
| 4,067,235 A | | 1/1978 | Markland et al. | |
| 4,134,120 A | * | 1/1979 | DeLoach et al. | 343/715 |
| 4,160,234 A | * | 7/1979 | Karbo et al. | 340/447 |
| 4,623,190 A | * | 11/1986 | Fujimori et al. | 296/198 |
| 5,335,540 A | | 8/1994 | Bowler et al. | |
| 5,945,908 A | * | 8/1999 | Nowicki et al. | 340/447 |
| 5,977,919 A | * | 11/1999 | Kudo et al. | 343/713 |
| 6,362,733 B1 | * | 3/2002 | Momose et al. | 340/447 |

FOREIGN PATENT DOCUMENTS

JP       10-44726 A     2/1998

* cited by examiner

*Primary Examiner*—Anh V. La
(74) *Attorney, Agent, or Firm*—Birch, Stewart, Kolasch & Birch, LLP (57) ABSTRACT

A wheel includes a disk form wheel, a tire fitted to the wheel, and a tire tube contained between the wheel and the tire, and is provided with an air pressure detection device intermediately disposed between the tire tube and the wheel. A metallic line form reception antenna is inserted by molding into a front fender. Since the distance from a transmission means fitted to an air pressure sensor to the reception antenna is reduced, reception sensitivity can be enhanced. In addition, since the reception antenna can be pitched to about the size of the fender, the reception sensitivity can be enhanced. Further, since jigs for fixing the antenna are needless, a reduction in the number of component parts can be contrived, and the antenna can be fixed without spoiling the appearance.

13 Claims, 7 Drawing Sheets

AIR PRESSURE DETECTION DEVICE FOR A WHEEL

CROSS-REFERENCE TO RELATED APPLICATIONS

The present application claims priority under 35 USC 119 to Japanese Patent Application No. 2001-021670 filed on Jan. 30, 2001 the entire contents thereof is hereby incorporated by reference.

BACKGROUND OF THE INVENTION

1. Field of the Invention

The present invention relates to an air pressure detection device for a wheel, and particularly to an air pressure detection device for a wheel having a structure in which a reception antenna is inserted by molding into a resin fender.

2. Description of Background Art

An air pressure detection device for a wheel which makes it possible for the driver to recognize the air pressure of a tire even during operation of the vehicle, there is known, for example, as set forth in Japanese Patent Laid-open No. Hei 10-44762, entitled "Tire Air Pressure Alarm Device."

As set forth in FIG. 1 of Japanese Patent Laid-open No. Hei 10-44762, a tire air pressure alarm device is set forth in which a valve stem 10 (symbols used in the publication are used here) is fitted to a wheel rim 1. A case 2 is disposed at a lower portion of the valve stem 10. A transmission unit 7 including a pressure detection portion 3, a signal processing circuit 4 and an electric cell 5 is contained in the case 2.

In order to receive an electromagnetic wave emitted from the transmission unit of such a tire air pressure alarm device, a reception antenna is needed. Generally, a reception antenna is incorporated in the receiver or an electric wire connected to the receiver.

However, in the case where the antenna incorporated in the receiver is used as the reception antenna, the position of the antenna depends on the position where the receiver is fixed. Necessarily, the position of the reception antenna is limited to the position where the receiver can be fixed. Where the position of the reception antenna is farther than the receiver, there is the problem that the sensitivity of the reception antenna is lowered.

In addition, since the reception antenna is incorporated in the receiver, the size of the reception antenna is limited to the size of the receiver. Therefore, when the receiver is reduced in size, the reception antenna cannot be enlarged in size, resulting in a problem that the sensitivity of the reception antenna cannot be enhanced.

Further, where an electric wire connected to the receiver is used as the reception antenna, a jig for fixing is needed for fixing the wire. Therefore, projection of the jig or the like occurs, leading to the problem that the appearance is spoiled.

SUMMARY AND OBJECTS OF THE INVENTION

In order to solve the above problems, it is an object of the present invention to provide an air pressure detection device for a wheel which has a reception antenna that is pitched widely, has high sensitivity, and has a good appearance.

In order to attain the above object, an air pressure detection device for a wheel according to the present invention includes an air pressure sensor for detecting the air pressure of a tire and a transmission means for emitting pressure information detected by the air pressure sensor provided on the side of a wheel of the vehicle. A reception means is provided on the side of the vehicle body. A reception antenna of the reception means is inserted by molding into a fender formed of an insulating resin.

Since the reception antenna of the reception means is inserted by molding into the fender formed of an insulating resin, the distance from the transmission means fitted to the air pressure sensor to the reception antenna is reduced, so that reception sensitivity is enhanced. In addition, since the reception antenna can be pitched substantially to the size of the fender, the reception sensitivity is also enhanced. Further, since jigs for fixing the antenna are needless, a reduction in the number of component parts can be contrived.

The present invention includes an embodiment wherein the reception antenna is a metallic antenna. Since the reception antenna is metallic, the connection of an electric wire leading to the receiver can be easily connected by soldering or the like, so that wiring is easy.

The present invention includes an embodiment wherein the reception antenna is an electrically conductive resin antenna. Since the reception antenna is made of a resin, it is possible to set the thermal expansion of the antenna to be substantially the same as that of the resin forming the fender. Therefore, internal stress between the inserted by molding antenna and the fender due to temperature variation will not be generated, so that the antenna can have a long useful life even when used in an environment with severe temperature changes.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will be described below based on the attached drawings. The terms "front," "rear," "left," "right," "upper" and "lower" conform to the directions as viewed from the driver, and Fr means the front side, Rr means the rear side, L means the left side, and R means the right side.

Figure 1:
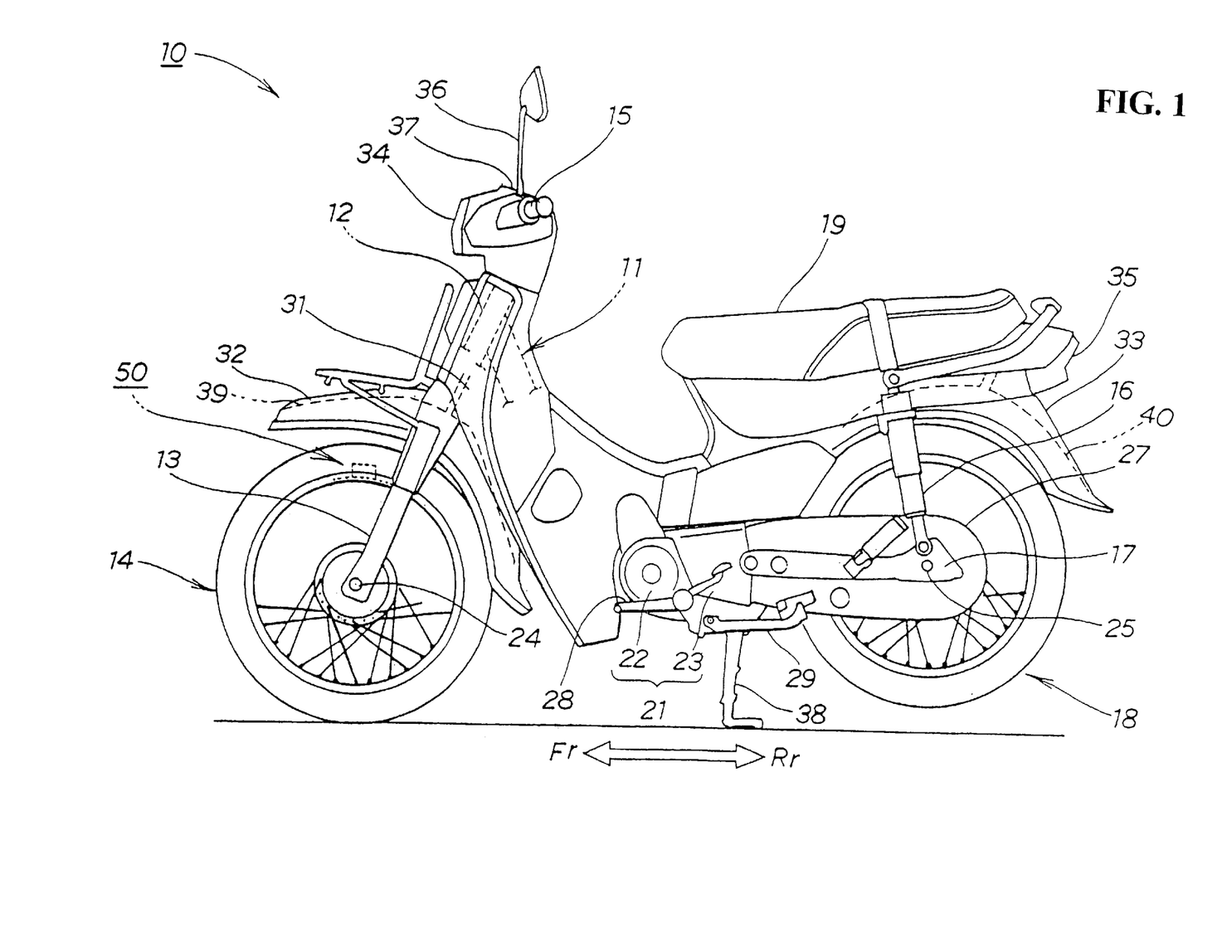
FIG. 1 is a side view of a motorcycle on which an air pressure detection device for a wheel according to the present invention is mounted.

FIG. 1 is a side view of a motorcycle on which an air pressure detection device for a wheel according to the present invention is mounted. The motorcycle 10 includes a vehicle body frame 11 extending towards a rear lower portion of the vehicle. A head pipe 12 is fitted to the vehicle body frame 11 with a front fork 13 fitted to the head pipe 12 and a front wheel 14 is fitted to the front fork 13. A handle 15 is connected to the front fork 13 and a rear shock absorber 16 including one end fitted to a rear upper portion of the vehicle body frame 11 and a swing arm 17 is swingably fitted between the other end of the rear shock absorber 16 and a rear lower portion of the vehicle body frame 11. A rear wheel 18 is fitted to the tip end of the swing arm 17. A seat 19 is disposed at a rear upper portion of the vehicle body frame 11 and a power unit 21 including an engine 22 and a speed change gear 23 is disposed on the lower side of the vehicle body frame 11.

As illustrated in FIG. 1, axles 24 and 25, a drive chain cover 27, a brake pedal 28, a kick pedal 29, a leg shield 31, a front fender 32, a rear fender 33, a head lamp 34, a tail lamp 35, a rear view mirror 36, a meter panel 37, and a stand 38 are operatively connected to the vehicle body frame 11. The front fender 32 and the rear fender 33 are formed of an insulating resin.

An air pressure detection device 50 for the wheel (hereinafter referred to simply as "air pressure detection device 50"), which, as described later, is a device for detecting the air pressure of a tire and enabling the driver to recognize the air pressure of the tire even during operation of the vehicle. Reception antennas 39 and 40, are molded in the front fender 32 and the rear fender 33.

Figure 2:
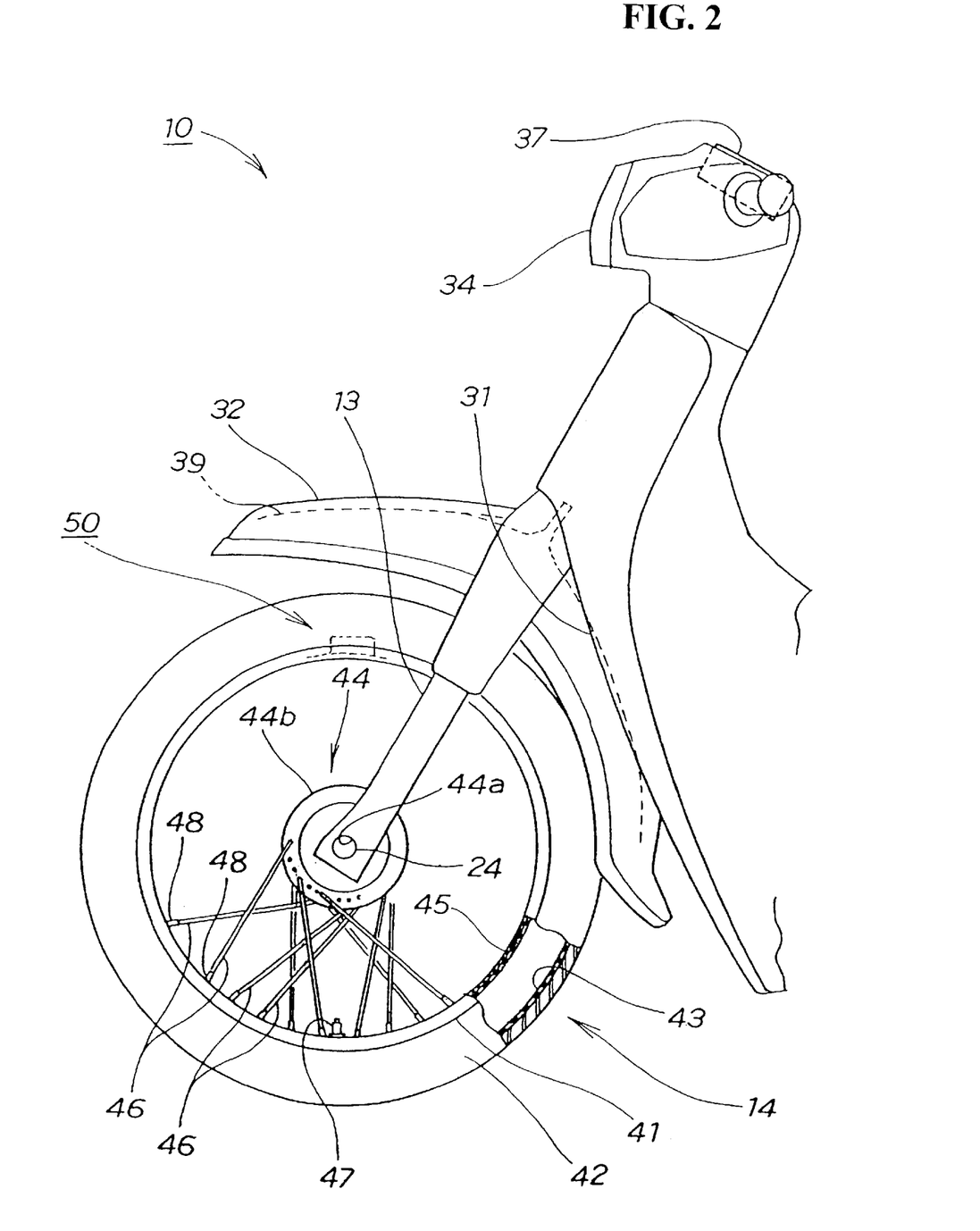
FIG. 2 is a side view of a front portion of the motorcycle on which the air pressure detection device for a wheel according to the present invention is mounted.

FIG. 2 is a side view of a front portion of the motorcycle on which the air pressure detection device for a wheel according to the present invention is mounted.

The wheel 14 comprises a disk-form wheel 41, a tire 42 fitted to the wheel 41, and a tire tube 43 contained between the wheel 41 and the tire 42. The air pressure detection device 50 is intermediately disposed between the tire tube 43 and the wheel 41. In the front fender 32, a metallic line-form reception antenna 39 is inserted by molding. Incidentally, the tire tube 43 is provided with an air valve 47 for injecting air.

Figure 3:
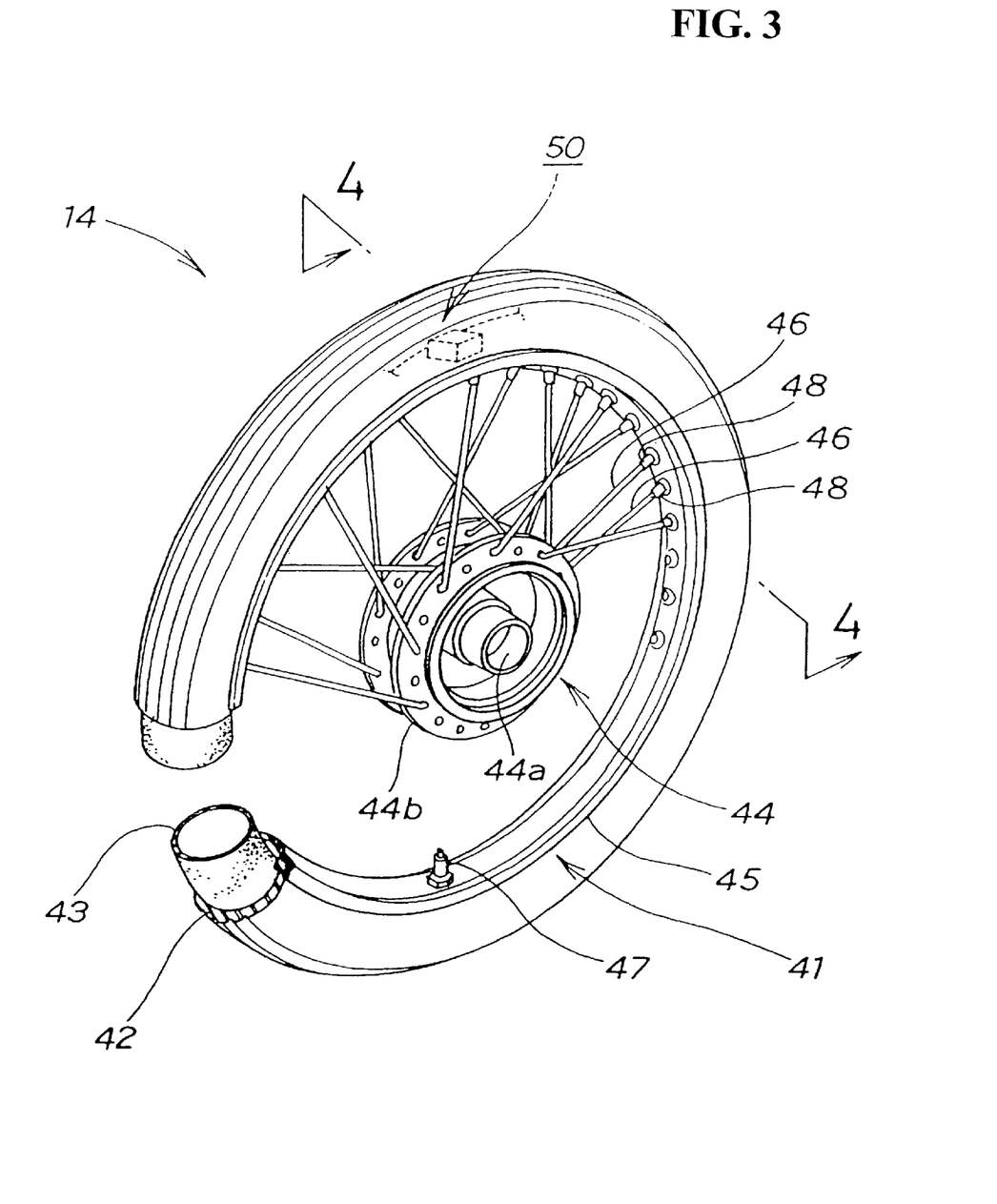
FIG. 3 is a perspective view of a wheel on which the air pressure detection device for a wheel according to the present invention is mounted.

FIG. 3 is a perspective view of a wheel on which the air pressure detection device for a wheel according to the present invention is mounted. The wheel 41 comprises a hub 44 rotatably fitted to the axle 24, a rim 45 to which the tire 42 is fitted, and a plurality of spokes 46 . . . ( . . . means plurality, here and hereinafter) for connecting the rim 45 and the hub 44.

The hub 44 comprises a bearing portion 44a fitted to the axle 24 through a bearing (not shown), and disk portions 44b . . . on which the plurality of spokes 46 . . . are hooked, and the rim 45 is provided with the air valve 47 for injecting air into the tire 42.

The spoke 46 has one end hooked on the disk portion 44b of the hub 44, and the other end fitted to the rim 45 through a nipple 48, whereby the rim 45 and the hub 44 are integrally connected.

Incidentally, the rear wheel 18 shown in FIG. 1 has substantially the same construction as that of the wheel of the front wheel 14, and a detailed description thereof is omitted.

Figure 4:
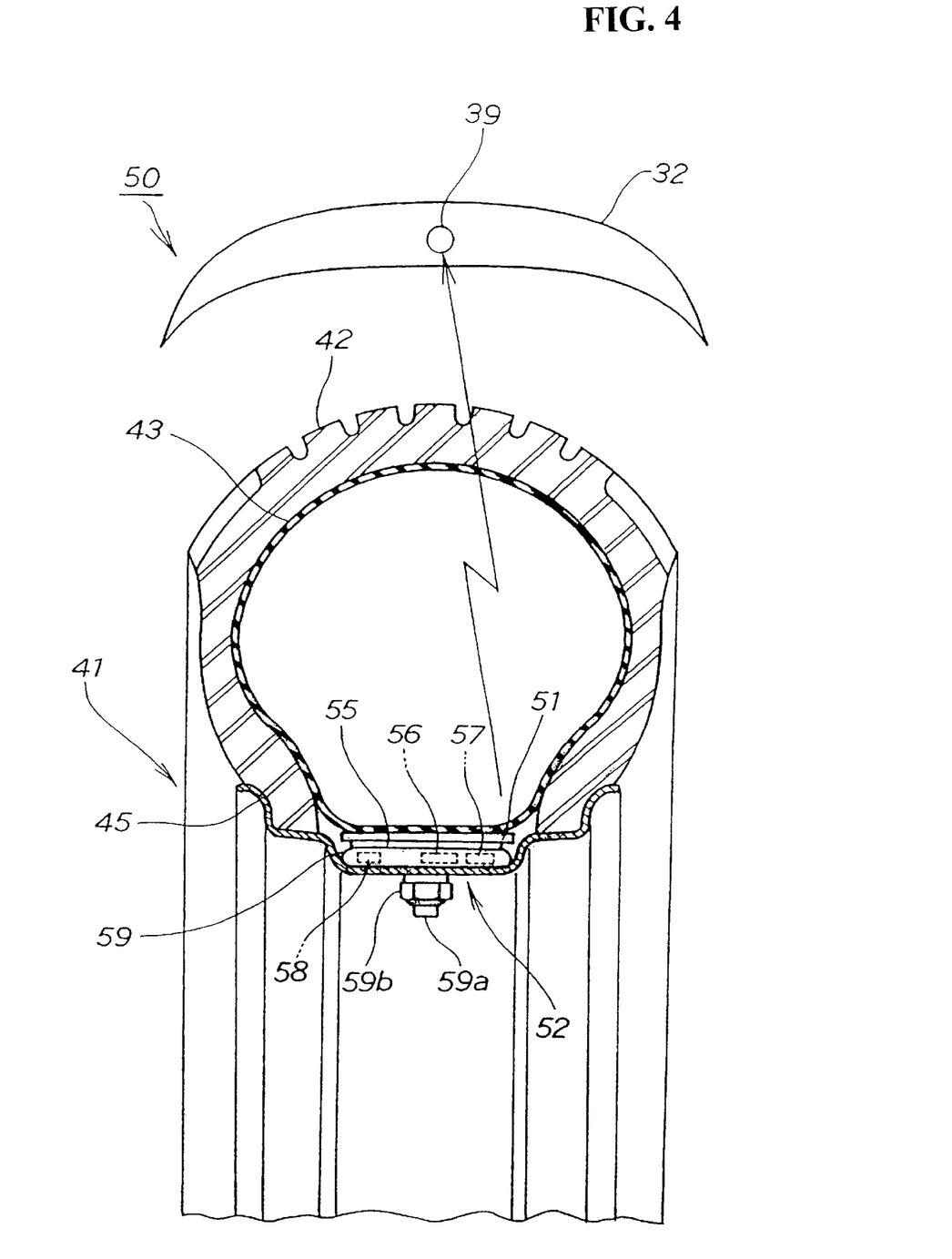
FIG. 4 is a sectional view taken along line 4—4 of FIG. 3.

FIG. 4 is a sectional view taken along line 4—4 of FIG. 3, that illustrates a front section of the air pressure detection device 50. At an upper portion of FIG. 4, a section of the front fender 32 is shown.

The air pressure detection device 50 comprises comprising a pressure-receiving plate 51 provided on an outside surface of the tire tube 43 and a pressure sensor 55 for detecting the pressure of the pressure-receiving plate 51, a transmission means consisting of a detection and transmission unit 52 as a detection and transmission circuit for detecting pressure information from the air pressure sensor 55, transforming the pressure information into an electrical signal and emitting the electrical signal through electromagnetic waves, a reception antenna 39 inserted by molding into the front fender 32 for receiving the pressure information from the detection and transmission unit 52, and a display and alarm unit 53 for issuing a display or alarm connected from the reception antenna 39. The air pressure sensor 55 includes the pressure-receiving plate 51. The pressure sensor 55 and the detection and transmission unit 52 are sequentially laid on each other in this order in the radial direction from the rim 45 toward the tire tube 43.

The detection and transmission unit 52 comprises a detection circuit 56 connected to the air pressure sensor 55 so as thereby to pick up the pressure information as an electrical signal, a transmission circuit 57 for transmitting the electrical signal of the detection circuit 56 as an electromagnetic wave, an electric cell 58 for driving the detection circuit 56 and the transmission circuit 57, and a case 59 for collectively containing the detection circuit 56, the transmission circuit 57 and the electric cell 58.

The case 59 is provided with a screw shaft 59a for fixing to the rim 45, and a nut 59b is fastened onto the screw shaft 59a, whereby the case 59 is fitted to the rim 45.

The reception antenna 39 is a metallic line-form antenna, which is inserted by molding into the front fender 32 formed of an insulating resin, in the state of being stretched in the front-rear direction of the fender. An electric wire extends from the reception antenna 39 and passes through the head pipe 12 and is connected to the reception circuit of the display and alarm unit which will be described below.

Figure 5:
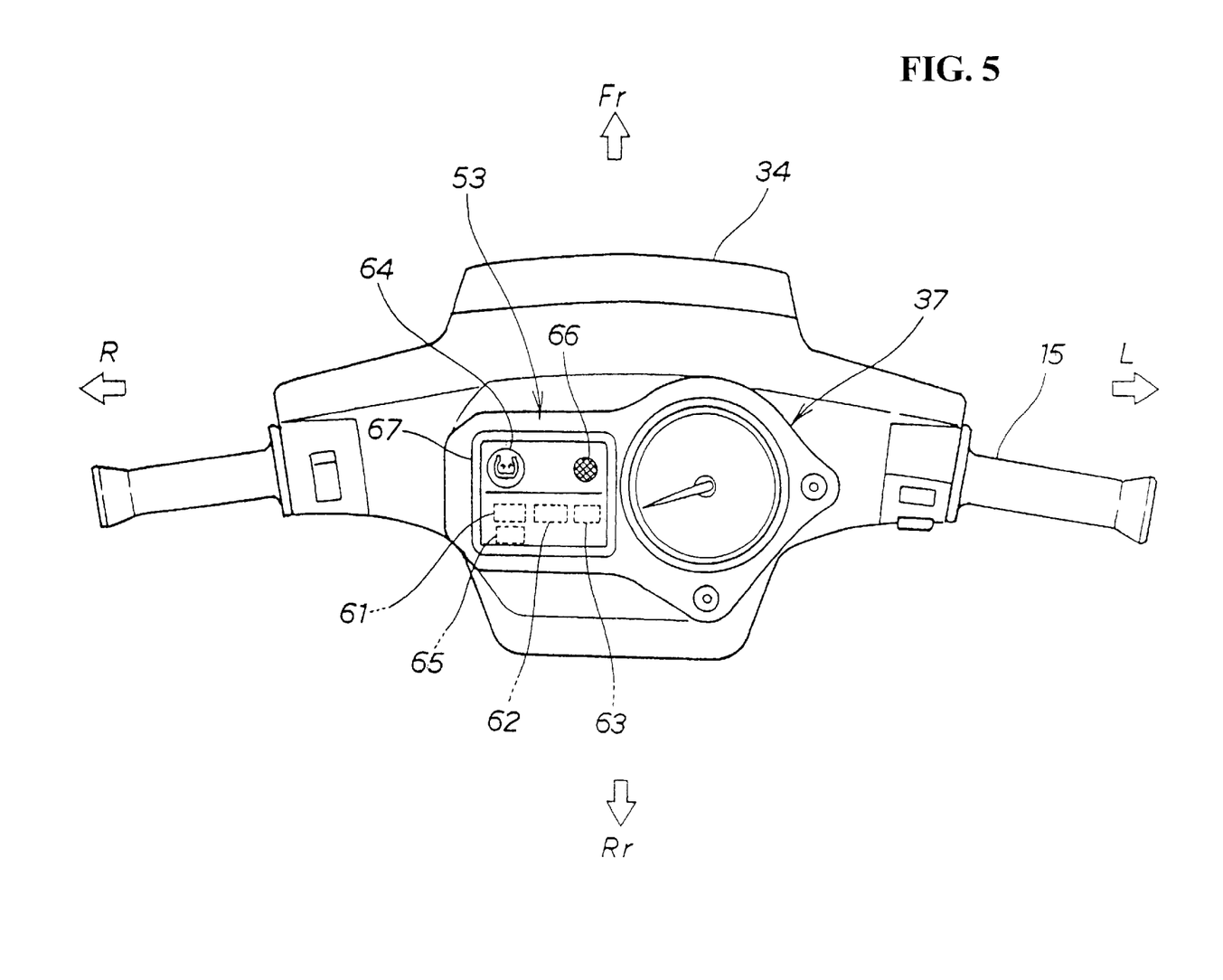
FIG. 5 is a plan view of a display and alarm unit of the air pressure detection device for a wheel according to the present invention.

FIG. 5 is a plan view of a display and alarm unit of the air pressure detection device for a wheel according to the present invention, that illustrates the surface of the meter panel 37 fitted to the handle 15.

The display and alarm unit 53, provided at the meter panel 37, includes a reception means consisting of a reception circuit 61 for receiving the electromagnetic wave transmitted from the detection and transmission unit 52 shown in FIG. 3 through the reception antennas 39 and 40 inserted by molding into the fenders 32 and 33. A voltage amplifying circuit 62 is provided for amplifying a signal received by the reception circuit 61. A display circuit 63 is provided for displaying a tire pressure based on the voltage value amplified by the voltage amplifying circuit 62. A display means 64 is driven by the display circuit 63. An alarm driving circuit 65 is operated when the voltage value amplified by the voltage amplifying circuit 62 is lower than a preset voltage value. An alarm means 66 is driven by the alarm driving circuit 65. A housing 67 is provided for collectively containing the reception circuit 61, the voltage amplifying circuit 62, the display circuit 63, the display means 64, the alarm driving circuit 65 and the alarm means 66.

Figure 6:
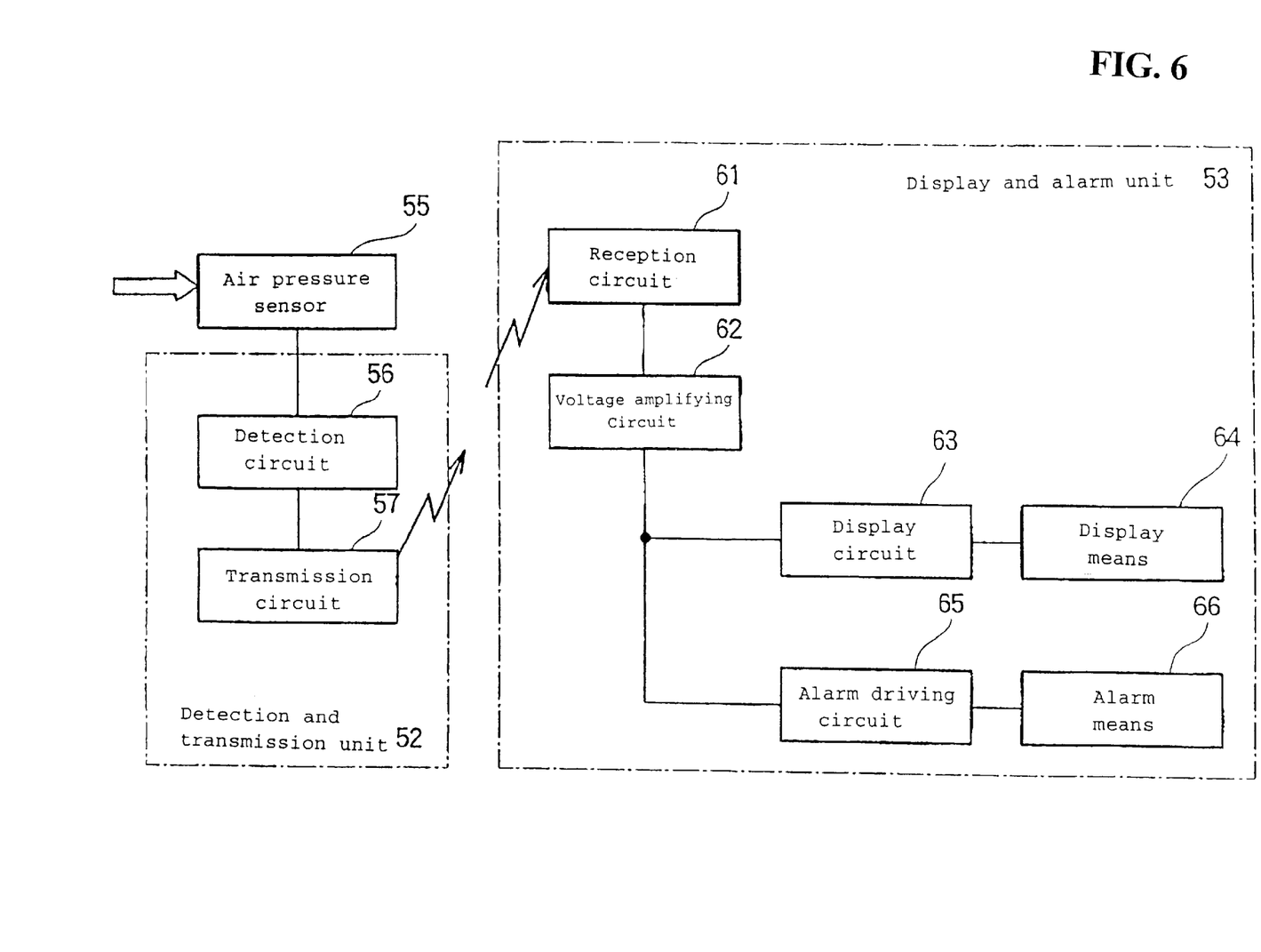
FIG. 6 is a block diagram of the air pressure detection device for a wheel according to the present invention.

The operation of the air pressure detection device 50 described above will be described below. FIG. 6 is a block diagram of the air pressure detection device for a wheel according to the present invention, in which tire pressure is detected by the air pressure sensor 55, the pressure information is picked up as an electrical signal by the detection circuit 56, and the electrical signal is transmitted by the transmission circuit 57 to the reception antenna 39 connected to the side of the display and alarm unit 53.

The electromagnetic wave transmitted from the detection and transmission unit 52 is received by the reception circuit 61 through the reception antenna 39, the signal received by the reception circuit 61 is amplified by the voltage amplifying circuit 62. The amplified signal is transformed into a predetermined signal by the display circuit 63 for displaying the tire pressure based on the voltage value amplified by the voltage amplifying circuit 62, and the tire pressure is displayed by the display means 64.

When the voltage value amplified by the voltage amplifying circuit 62 is lower than a preset voltage value, the alarm driving circuit 65 is operated, and the insufficient tire pressure condition is announced by the alarm means 66.

Figure 7:
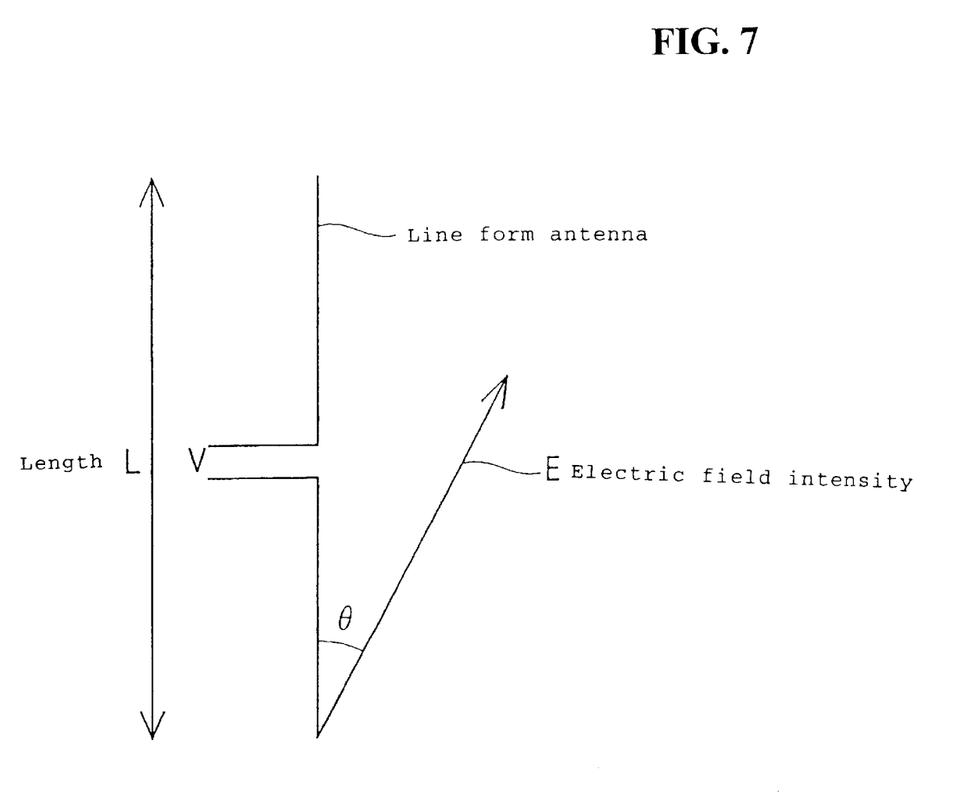
FIG. 7 is an illustration showing the relationship between an electric field intensity and the voltage induced in the reception antenna.

In order to consider an induction voltage received by the reception antenna 39, a line form antenna with a length L disposed at a position at a distance r from the transmitter (electromagnetic wave source) will be considered referring to the FIG. 7.

FIG. 7 is an illustration showing the relationship between the electric field intensity and the voltage induced in the reception antenna. Generally, when an electromagnetic wave source with a radiation electric power P radiates an electromagnetic wave uniformly in all directions like a point light source, the magnitude of electric power density on a spherical surface at a distance r from the electromagnetic wave source is $P/4\pi r^2$. At this time, when the electromagnetic field on the spherical surface is deemed as a plane wave, the electric field intensity E at a distance r is reversely proportional to the distance r, and decreases as the distance r from the electromagnetic wave source increases. When the electric field intensity at the distance r is E, the voltage induced in the line form antenna disposed in the electromagnetic field at the electric field intensity E is $L_{EFF}E\cos\theta$, where $L_{EFF}$ is the effective length of the reception antenna, and the effective length $L_{EFF}$ for the line form antenna (length L) sufficiently short relative to the wavelength is approximated to be L/2; and θ is the angle between the line form antenna and the electric field vector. Thus, the electric field intensity at the position of the reception antenna is greater as the distance from the transmitter to the reception antenna is shorter, and the induced voltage is greater and reception sensitivity is increased as the length of the reception antenna is greater.

From the above discussion, since the reception antennas 39 and 40 are inserted by molding into the front fender 32 and the rear fender 33, the length of the reception antenna is greater than that of a reception antenna incorporated in a unit, and a greater induced voltage V is obtained. In addition, the distance r between the reception antenna and the transmission circuit is the distance to the fenders 32 and 33, and is short, so that the electric field intensity at the position of the reception antennas is high. Therefore, the sensitivity of the reception antenna is increased, and the signal from the air pressure sensor can be accurately received.

While the metallic antenna is used as the reception antenna in the embodiment, an electrically conductive resin antenna may also be used. In that case, the reception antenna insert-molded in the resin-made fender is also made of resin, so that the fender and the reception antenna can have equal coefficients of thermal expansion. Therefore, internal stress due to thermal expansion is not generated between the fender and the reception antenna even upon temperature variations, so that the antenna has a long useful life even in the environments with severe temperature changes.

In addition, while the reception antenna insert-molded in the fender is a line form antenna in the above embodiment, an antenna of other forms such as a loop antenna may also be inserted by molding.

Further, while the air pressure detection device for a tire having a tire tube has been described in the above embodiment, the air pressure detection device having the reception antenna can be used also for a tubeless tire.

Besides, while the vehicle has been described as a motorcycle 10 as shown in FIG. 1 in the above embodiment, the vehicle is not limited to motorcycle, and may also be a four-wheel or three-wheel vehicle.

Further, while the display means 64 and the alarm means 66 have been provided at the meter panel 37 as shown in FIG. 4 in the above embodiment, this construction is not limitative. For example, means issuing an alarm may be provided at the vehicle body frame or a helmet or the like, and means utilizing vibration may be provided at the seat or helmet or the like. While the reception antenna 39 and the display and alarm unit 53 have been described as the unit for the front wheel 14 (See FIG. 1), the reception antenna 40 for the rear wheel 18 (See FIG. 1) is similarly connected, and display and alarm actions can be achieved.

The present invention is directed to a vehicle including an air pressure sensor for detecting the air pressure of a tire and a transmission means for emitting the pressure information detected by the air pressure sensor provided on the side of a wheel of the vehicle, and a reception means provided on the side of the vehicle body. The reception antenna of the reception means is inserted by molding into a fender formed of an insulating resin. Therefore, the distance from the transmission means fitted to the air pressure sensor to the reception antenna is reduced, so that reception sensitivity can be enhanced. In addition, since the reception antenna can be pitched to about the size of the fender, the reception sensitivity can also be enhanced. Further, since jigs for fixing the antenna are not needed, a reduction in the number of component parts can be contrived. In addition, the antenna can be fixed without spoiling the appearance.

The present invention includes an embodiment wherein the reception antenna is a metallic antenna. Therefore, the connection to an electric wire leading to the receiver can be easily performed by soldering or the like, so that wiring can be conducted easily.

The present invention includes an embodiment wherein the reception antenna is an electrically conductive resin antenna. Therefore, thermal expansion of the reception antenna can be set to be substantially the same degree as that of the resin constituting the fender. Accordingly, internal stress due to temperature variation is not generated between the insert-molded antenna and the fender, so that the antenna can have a long use life even when used in an environment with severe temperature changes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air pressure detection device for a wheel of a vehicle comprising:

an air pressure sensor for detecting the air pressure of a tire;

detection and transmission means for emitting pressure information detected by said air pressure sensor provided on a side of said wheel of said vehicle, the detection and transmission means being fixed to a rim of the wheel by a screw shaft and nut, the detection and transmission means being in a position different from an air valve; and reception means provided on a side of the vehicle body;

wherein a reception antenna of said reception means is inserted by molding into a fender formed of an insulating resin.

2. The air pressure detection device for a wheel as set forth in claim 1, wherein said reception antenna is a metallic antenna, the reception antenna being stretched in a front-rear direction of the fender.

3. The air pressure detection device for a wheel as set forth in claim 1, wherein said reception antenna is an electrically conductive resin antenna.

4. The air pressure detection device for a wheel as set forth in claim 1, and further including a pressure-receiving plate having a surface facing an outside surface of a tire tube, said pressure-receiving plate being operatively mounted relative to said air pressure sensor for enabling said pressure sensor to detect the pressure of the tire tube.

5. The air pressure detection device for a wheel as set forth in claim 1, wherein said detection and transmission means includes a detection circuit and a transmission circuit for detecting pressure from the air pressure sensor, transforming the pressure into an electrical signal and emitting the electrical signal through electromagnetic waves to the reception antenna.

6. The air pressure detection device for a wheel as set forth in claim 4, wherein said detection and transmission means and said pressure-receiving plate are sequentially laid on each other in this order in the radial direction from the rim of the tire towards the tire tube.

7. The air pressure detection device for a wheel as set forth in claim 1, wherein said reception antenna is disposed in close proximity to said transmission means for increasing sensitivity.

8. An air pressure detection device adapted for use with a wheel of a vehicle comprising:

an air pressure sensor operatively connected to a tire for detecting air pressure;

detection and transmission means for transmitting pressure information detected by said air pressure sensor;

a case for housing the air pressure sensor, the case being provided with a screw shaft for penetrating through the rim;

a nut fastened onto the screw shaft, whereby the case is fitted to the rim; and reception means adapted to be provided on a vehicle body;

wherein said reception means is inserted by molding into a fender, said reception means being disposed in close proximity to said detection and transmission means for increasing sensitivity.

9. The air pressure detection device for a wheel as set forth in claim 8, wherein said reception means is a metallic line-form reception antenna.

10. The air pressure detection device for a wheel as set forth in claim 8, wherein said reception means is an electrically conductive resin antenna.

11. The air pressure detection device for a wheel as set forth in claim 8, and further including a pressure-receiving plate operatively having a surface facing an outside surface of a tire tube, said pressure-receiving plate being operatively mounted relative to said air pressure sensor for enabling said pressure sensor to detect the pressure of the tire tube.

12. The air pressure detection device for a wheel as set forth in claim 8, wherein said detection and transmission means includes a detection circuit and a transmission circuit for detecting pressure from the air pressure sensor, transforming the pressure into an electrical signal and emitting the electrical signal through electromagnetic waves to the reception antenna.

13. The air pressure detection device for a wheel as set forth in claim 11, wherein the detection and transmissions means and said pressure-receiving plate are sequentially laid on each other in this order in the radial direction from the rim of the tire towards a tire tube.

* * * * *